(No Model.)

B. H. POMEROY.
DRILL AND TAP SCALE.

No. 447,475. Patented Mar. 3, 1891.

WITNESSES:
C. Thomas
W. E. Johnston

INVENTOR
Bennard H. Pomeroy
BY E. V. Thomas
ATTORNEY

United States Patent Office.

BENNARD H. POMEROY, OF NEW YORK, ASSIGNOR TO POMEROY MACHINE CO., OF BROOKLYN, NEW YORK.

DRILL AND TAP SCALE.

SPECIFICATION forming part of Letters Patent No. 447,475, dated March 3, 1891.

Application filed February 6, 1889. Renewed January 27, 1891. Serial No. 379,245. (No model.)

*To all whom it may concern:*

Be it known that I, BENNARD H. POMEROY, a citizen of the United States, and a resident of the city, county, and State of New York, have invented a new and useful Improvement in Drill and Tap Scales, of which the following is a specification.

The object of this invention is to facilitate the selection of proper drills for taps.

The invention consists in arranging the size of taps, number of drills for the proper size of thread and clearance-drills, so that they can be readily selected without the usual annoyance of calipering.

Figure 1:
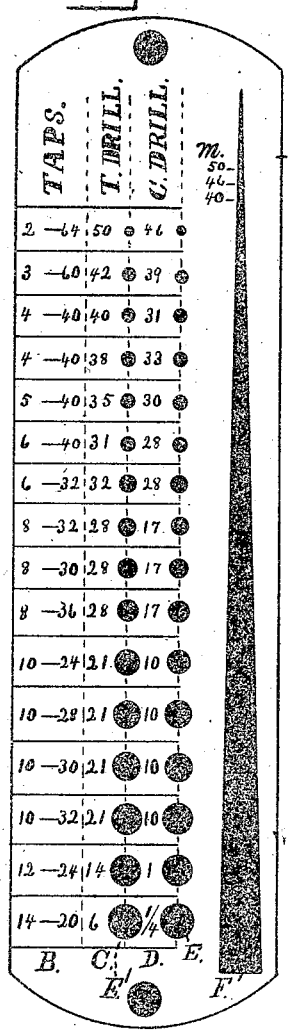
Figure 2:
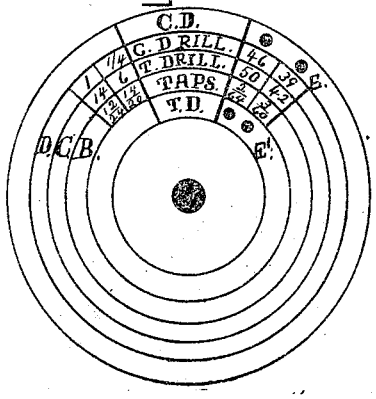

Figure 1 shows my improved scale provided with the proper figures and characters to indicate the size, and Fig. 2 shows a modification as to shape.

A represents a scale provided with my improvements made from sheet metal or other suitable material.

Previous to my invention, in selecting a proper drill for a tap, it was customary to test the size by calipering or by drilling a hole in a piece of metal and try the tap to see if the drill was suitable. This required a great loss of time and inconvenience, necessitating many mistakes. To avoid this trouble and to facilitate the selection, I print or stamp upon suitable material a graduating-scale, which shows at a glance the proper size drills which should be used for the tap selected.

In drilling holes for screws two sizes are frequently required, one for the thread, called the "tap-drill," the other, large enough to admit the screw, called the "clearance-drill." Column B upon the scale indicates the size of the taps and the number of threads to the inch. Column C gives the size of the tap-drill, which is smaller than the tap, so that a suitable thread will be cut. Column D indicates the size of the clearance-drill, which is large enough to admit of the free passage of the screw. Thus it will be seen that a 2-64 tap will require a No. 50 drill for the thread and a No. 46 for clearance. The holes E and E' are the size of the drills for taps and clearance in the same line from left to right. The hole F is a tapering scale, and is provided with numbers to denote the diameter of the drills, as at $m$. This can be used instead of the holes E.

Instead of shaping the scale as in Fig. 1, I may arrange it as in Fig. 2, which I show as a modification, the letters and numbers corresponding to those of Fig. 1. I have not shown a full set of taps and drills, but sufficient to explain my invention. I do not deem it essential to have the holes E E' or F; but for convenience to test drills not numbered or in making new ones I combine it with the scale.

Having thus fully described my improvement, what I desire to secure by Letters Patent of the United States is—

1. A scale provided with the column B, designating the size of the taps, in combination with the column C, designating the size of tap-drills, as and for the purposes specified.

2. A scale provided with the column B, designating the size of the taps, in combination with the column D, designating the size of the clearance-drills, as and for the purpose specified.

3. A scale provided with the column B, designating the size of taps, in combination with the column C, designating the size of the tap-drills, and column D, designating the size of the clearance-drills, as and for the purpose specified.

4. A scale provided with the column B, designating the size of the taps, in combination with the hole E, designating the size of the clearance-drills, and hole E', designating the size of the tap-drills, as and for the purpose specified.

In testimony whereof I subscribe my name in the presence of two witnesses.

BENNARD H. POMEROY.

Witnesses:
E. T. THOMAS,
WM. E. JOHNSTON.